(12) United States Patent
Kuroda et al.

(10) Patent No.: US 7,578,209 B2
(45) Date of Patent: Aug. 25, 2009

(54) METAL ELEMENT INSPECTION DEVICE AND METAL ELEMENT INSPECTION METHOD

(75) Inventors: Hiroaki Kuroda, Mishima (JP); Eiichiro Muramatsu, Fuji (JP)

(73) Assignee: JATCO Ltd. (JP)

( * ) Notice: Subject to any disclaimer, the term of this patent is extended or adjusted under 35 U.S.C. 154(b) by 581 days.

(21) Appl. No.: 11/235,195

(22) Filed: Sep. 27, 2005

(65) Prior Publication Data

US 2006/0065065 A1    Mar. 30, 2006

(30) Foreign Application Priority Data

Sep. 30, 2004    (JP)    ............... 2004-286953

(51) Int. Cl.
*G01M 19/00*    (2006.01)
*G01B 5/00*    (2006.01)

(52) U.S. Cl. .................... 73/865.8; 33/556

(58) Field of Classification Search .......... 73/865.8; 33/501, 501.4, 501.06, 513, 354, 354.4, 567, 33/567.1, 556, 559; 474/201, 242–246; 702/81; 264/40.5, 320; 29/281.1
See application file for complete search history.

(56) References Cited

U.S. PATENT DOCUMENTS

| | | | |
|---|---|---|---|
| 4,692,985 A * | 9/1987 | Van Dijk | 29/450 |
| 4,831,741 A * | 5/1989 | Sogoian | 33/502 |
| 4,894,049 A * | 1/1990 | Koppelaars | 474/240 |
| 6,684,473 B1 * | 2/2004 | Yamagishi et al. | 29/407.01 |
| 6,779,414 B2 * | 8/2004 | Shori et al. | 73/865.9 |
| 6,869,376 B2 * | 3/2005 | Pennings et al. | 474/270 |
| 6,994,645 B2 * | 2/2006 | Tange | 474/204 |
| 7,188,430 B2 * | 3/2007 | Tange | 33/544.4 |
| 7,298,470 B2 * | 11/2007 | Tange | 356/237.2 |
| 7,444,892 B2 * | 11/2008 | Kuroda et al. | 73/865.9 |
| 2005/0009658 A1 * | 1/2005 | Fichtinger et al. | 474/242 |
| 2005/0241170 A1 * | 11/2005 | Tange | 33/606 |
| 2006/0037415 A1 * | 2/2006 | Kuroda et al. | 73/865.9 |

FOREIGN PATENT DOCUMENTS

EP    1 128 179 A2    8/2001
JP    2000-266130    9/2000

(Continued)

OTHER PUBLICATIONS

Dutch Search Report from the Netherlands Patent Office, May 4, 2007.

*Primary Examiner*—John Fitzgerald
(74) *Attorney, Agent, or Firm*—Blank Rome LLP

(57) ABSTRACT

A metal element inspection device comprising a conveying portion for sequentially transporting a plurality of metal elements, wherein a flank side recessed part formed in a metal element for a Continuously Variable Transmission belt is placed on a rail and travels along that rail; and an inspection rod inserted in noncontact with an opposite side recessed part of that metal element in the conveying state. The inspection device inspects for the existence of foreign matter being present as a result of interference by an uplifted portion of a metal element from the rail due to foreign matter lodged between a flank side recessed part of a metal element and the inspection rod, or interference by foreign matter lodged between an opposite side recessed part of that metal element and the inspection rod.

4 Claims, 6 Drawing Sheets

FOREIGN PATENT DOCUMENTS

| | | | |
|---|---|---|---|
| JP | 2001-124147 | 5/2001 | |
| JP | 2001-232306 | 8/2001 | |
| JP | 2001336903 A * | 12/2001 | ................ 33/544.4 |
| JP | 2003-231053 | 8/2003 | |
| JP | 2004131157 A * | 4/2004 | ................ 33/544.4 |
| NL | 1015572 | 11/2003 | |
| WO | WO 03/048601 A1 | 6/2003 | |

* cited by examiner

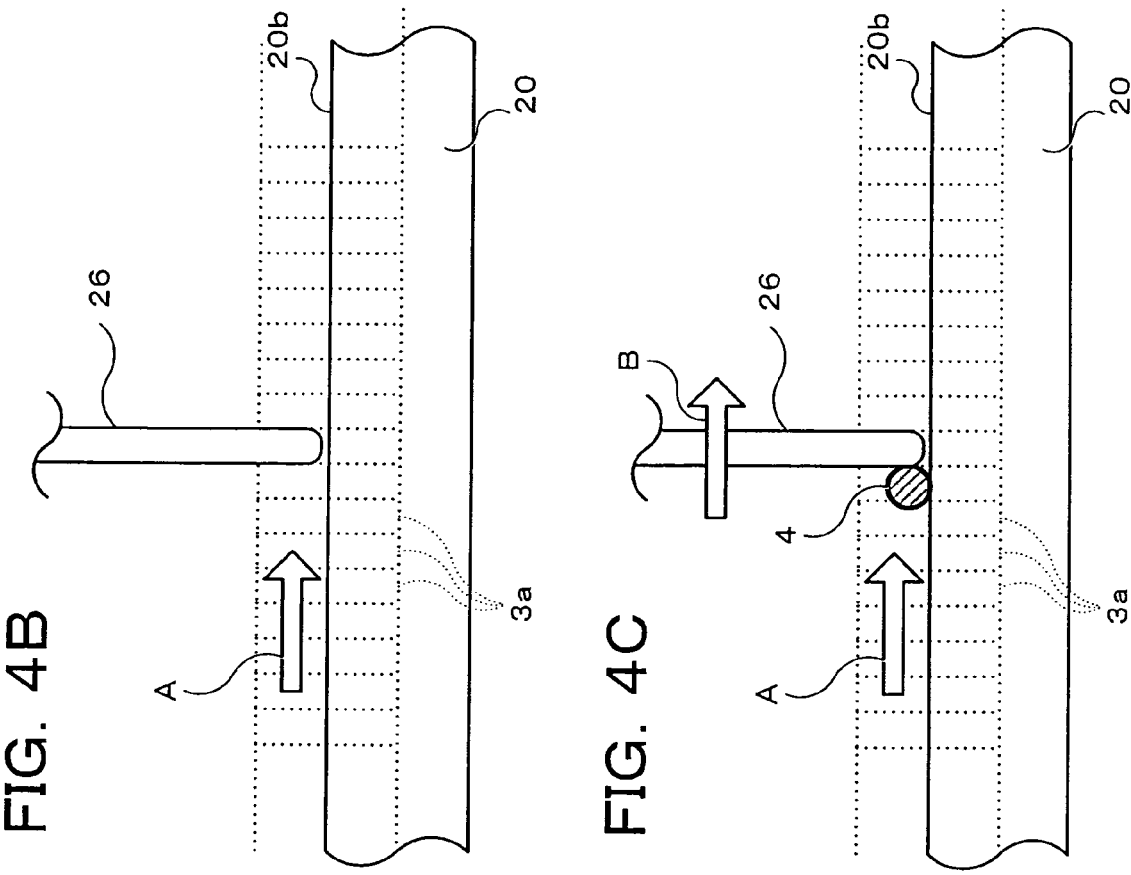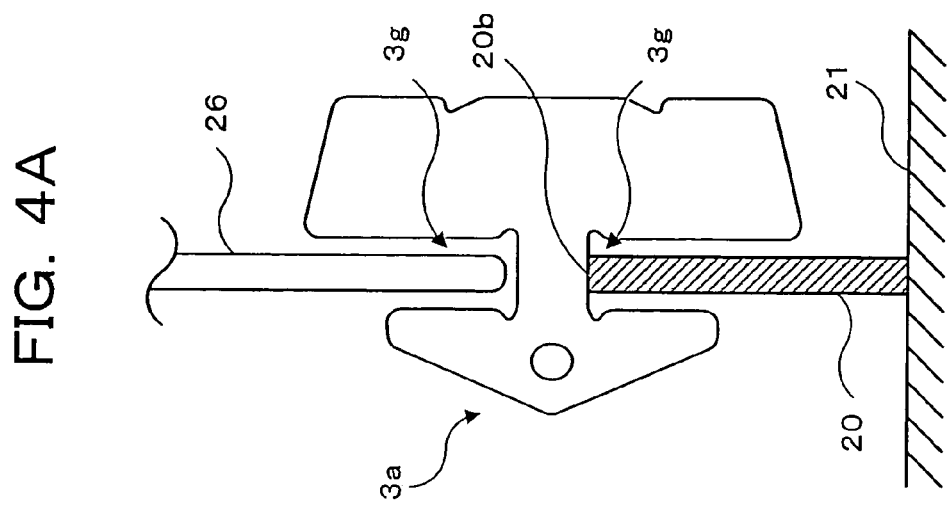

METAL ELEMENT INSPECTION DEVICE AND METAL ELEMENT INSPECTION METHOD

BACKGROUND OF THE INVENTION

1. Field of the Invention

The present invention relates to a metal element inspection device and a metal element inspection method for a metal element which is one of the constituent components in a V-belt for a Continuously Variable Transmission (commonly referred to as a "CVT belt").

2. Description of the Related Art

FIG. 6A is an outline view diagram of a CVT belt in conventional prior art. As shown in this diagram, a CVT belt 1 is constructed by assembling two laminated belts 2 containing a plurality of metal belts 2a (for example, a stack of about 12 endless layers) which are supported by thin trapezoidal layered elements 3 composed of a large number of metal elements 3a (for example, about 400 consecutive steel elements). For instance, as disclosed in Japanese Laid-Open (Kokai) Patent Application No. 2003-231053 titled "BARREL POLISHING METHOD AND BARREL POLISHING MEDIA", etc.

FIG. 6B is an outline view diagram of a metal element 3a. Each of the metal elements 3a consists of a steel block (small piece of metal) punch processed from a metal plate and molded into a specified shape. The specified shape, for example, is similar to the physical form of the upper-half image of a human body. Specifically, a metal element 3a resembles a molded shape having a head portion 3b and a chest portion 3c, along with a neck portion 3d which connects between the head portion 3b and the chest portion 3c. A protrusion 3e (raised circular knurl) is formed in one direction of the surface side (front surface as seen in FIG. 6B) of the head portion 3b and a cavity 3f (circular indent) is formed in the same location on the opposite direction surface side (rear surface of drawing). Alignment of the metal elements 3a is accomplished by consecutively inserting the protrusion 3e into the cavity 3f of adjoining metal elements 3a.

Two laminated belts 2 are inserted in the recessed parts 3g (belt grooves) containing an infinitesimal space clearance width "L" of about several millimeters (mm) formed between the head portion 3b and the chest portion 3c of the metal elements 3a, respectively.

Here, although the metal elements 3a as stated above are punch processed from a metal plate and molded, after punch processing, the metal elements 3a are subjected to polishing (generally, barrel polishing) for creating a surface finish. Barrel polishing is a known technique which places a grinding object (referred to as "work": the metal elements 3a mentioned above) and an abradant material (media) in a container (barrel tumbler) and surface treatment for removal of burrs (rough edges), "R" attachments, etc. is performed by relative friction between the work and the media generated during movement of the barrel.

Apart from that, since the metal elements 3a have an infinitesimal space clearance width "L" of about several millimeters (mm) formed between the head portion 3b and the chest portion 3c, when the size of the media (abrasive compound mixture) exceeds the width "L" between the recessed parts 3g, the recessed parts 3g cannot be polished. Consequently, removal of burrs (deburring) and "R" attachments in these recessed parts 3g can not be carried out.

Therefore, media of different sizes are mixed together and used. A technique for performing entire surface finishing including the recessed parts 3g of the metal elements 3a is known (for example, the above-mentioned Japanese Patent Application No. 2003-231053).

In this conventional prior art, media of the size at least larger than "L" (hereinafter denoted as "large media") and media of the size smaller than "L" (hereinafter denoted as "small media") are mixed and used.

Large media can be used to perform surface finishing for other than the recessed parts 3g of the metal elements 3a. Small media can be used to perform surface finishing for the recessed parts 3g of the metal elements 3a.

However, as mentioned above, media of different sizes are mixed and used. When surface finishing of the metal elements 3a is performed, the following disadvantage is caused.

Polishing of the recessed parts 3g of the metal elements 3a is performed when small media enter the inner part of these recessed parts 3g. However, when the size of small media conforms to or is very similar in size to the recessed parts 3g, small media become lodged and are retained in the recessed parts 3g. Thus, in such a condition, there is a disadvantage that some of the small media is carried intact to a subsequent process.

Furthermore, the same disadvantage is also caused when a crack, a chip, etc. generated in large media becomes an object the size of these separated parts which is equivalent to the above-mentioned small media (conforms to or very near the size of the recessed parts 3g).

FIG. 6C is an outline view diagram of a metal element 3a state containing lodged media. As shown in this drawing, in a state where media 4 (foreign matter) is lodged in a recessed part 3g, this situation becomes a hindrance when assembling the metal elements 3a which support the laminated belts 2. These components have to be examined for the existence of lodged media 4 by visual observation. Consequently, a visual inspection of a large quantity of the metal elements 3a which involves a few hundred components for each CVT belt is very troublesome, inefficient and demands considerable manpower. In addition, although the foreign matter (media 4) in FIG. 6C is portrayed resembling a circular shape, this illustration is for convenience of explanation. There may be not only circular shapes but also various shapes.

SUMMARY OF THE INVENTION

Therefore, in view of the circumstances mentioned above, the present invention provides a metal element inspection device and a metal element inspection method for automating inspection of foreign matter lodged in the recessed parts of a metal element and reducing manpower. Accordingly, the present invention is aimed at achieving progression of improved efficiency and inspection precision.

A metal element inspection device related to the present invention comprises a conveying means for sequentially transporting a plurality of metal elements, wherein a flank side recessed part formed in a metal element for a Continuously Variable Transmission belt is placed on a rail and travels along the rail; and an inspection rod inserted in noncontact with an opposite side recessed part of the metal element in the conveying state. The metal element inspection device inspects for the existence of foreign matter being present as a result of interference by an uplifted portion of a metal element from the rail due to foreign matter lodged between a flank side recessed part of the metal element and the inspection rod, or interference by foreign matter lodged between an opposite side recessed part of the metal element and the inspection rod.

Also, as a preferable embodiment, the present invention further comprises a detecting means for detecting movement of the inspection rod; and a reporting means for reporting circumferential movement of the inspection rod when detected by the detecting means.

A metal element inspection method related to the present invention comprises the steps of: a conveying process for sequentially transporting a plurality of metal elements, wherein a flank side recessed part formed in a metal element for a Continuously Variable Transmission belt is placed on a rail and travels along that rail; and a detecting process for detecting movement of an inspection rod inserted in noncontact with an opposite side recessed part of the metal element in the conveying state. The detecting process detects interference by an uplifted portion of a metal element from the rail due to foreign matter lodged in a flank side recessed part of the metal element, or interference by foreign matter lodged in an opposite side recessed part of the metal element, and inspects for the existence of the foreign matter being present from that detection result.

As a preferable embodiment, the present invention further comprises a reporting process for reporting circumferential movement of the inspection rod when detected by the detecting process.

According to the present invention case of sequentially transporting a plurality of metal elements, a flank side recessed part formed in a metal element (trapezoidal type element with a recessed part on either side) is placed on a rail and travels along that rail. Subsequently, for example, if media from a previous process of barrel polishing is lodged in the opposite side recessed part (opposing side relative to the above-mentioned flank side) of that metal element, the existence of media is detected by interference with the inspection rod inserted in that recessed part.

Also, when media from a previous process of barrel polishing is lodged in the flank side recessed part (the recessed part as initially placed on the rail), the metal element becomes uplifted (elevated) from the rail by that media. Because of this uplifting, the metal element interferes with the inspection rod and similarly the existence of that media is detected.

Accordingly, inspection of lodged media can be automated. In this manner, various disadvantages associated with visual inspection are capable of being solved, such as being a difficult task to accomplish, lack of efficiency and inconsistent reliability.

Furthermore, when comprising a detecting means for detecting movement of the above-stated inspection rod and a reporting means for reporting circumferential status when movement of the inspection rod is detected by the detecting means, workers can be reliably notified about the detection result of lodged media.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4A is a diagram showing the relationship between the inspection rod 26 and the metal element 3$a$;

FIG. 4B is a diagram showing the relationship between the inspection rod 26 and the metal element 3$a$;

FIG. 4C is a diagram showing the relationship between the inspection rod 26 and the metal element 3$a$;

DETAILED DESCRIPTION OF THE PREFERRED EMBODIMENTS

Hereinafter, the preferred embodiments of the present invention will be described in detail with reference to the drawings.

Additionally, illustration of specific or example numerical values for various details in the following explanation or character strings and other symbols are merely references for a clear understanding of the concept of the present invention. Accordingly, the concept of the present invention should not be limited explicitly to this terminology entirely or in part.

Furthermore, explanation has been omitted which describes details of well-known methods, well-known procedures, well-known architecture, well-known circuit configurations, etc. (hereinafter denoted as "common knowledge") for the purpose of a concise explanation, but does not intentionally exclude this common knowledge entirely or in part. Therefore, relevant common knowledge already known by persons skilled in the art at the time of filing the present invention is naturally included in the following description.

Figure 1:
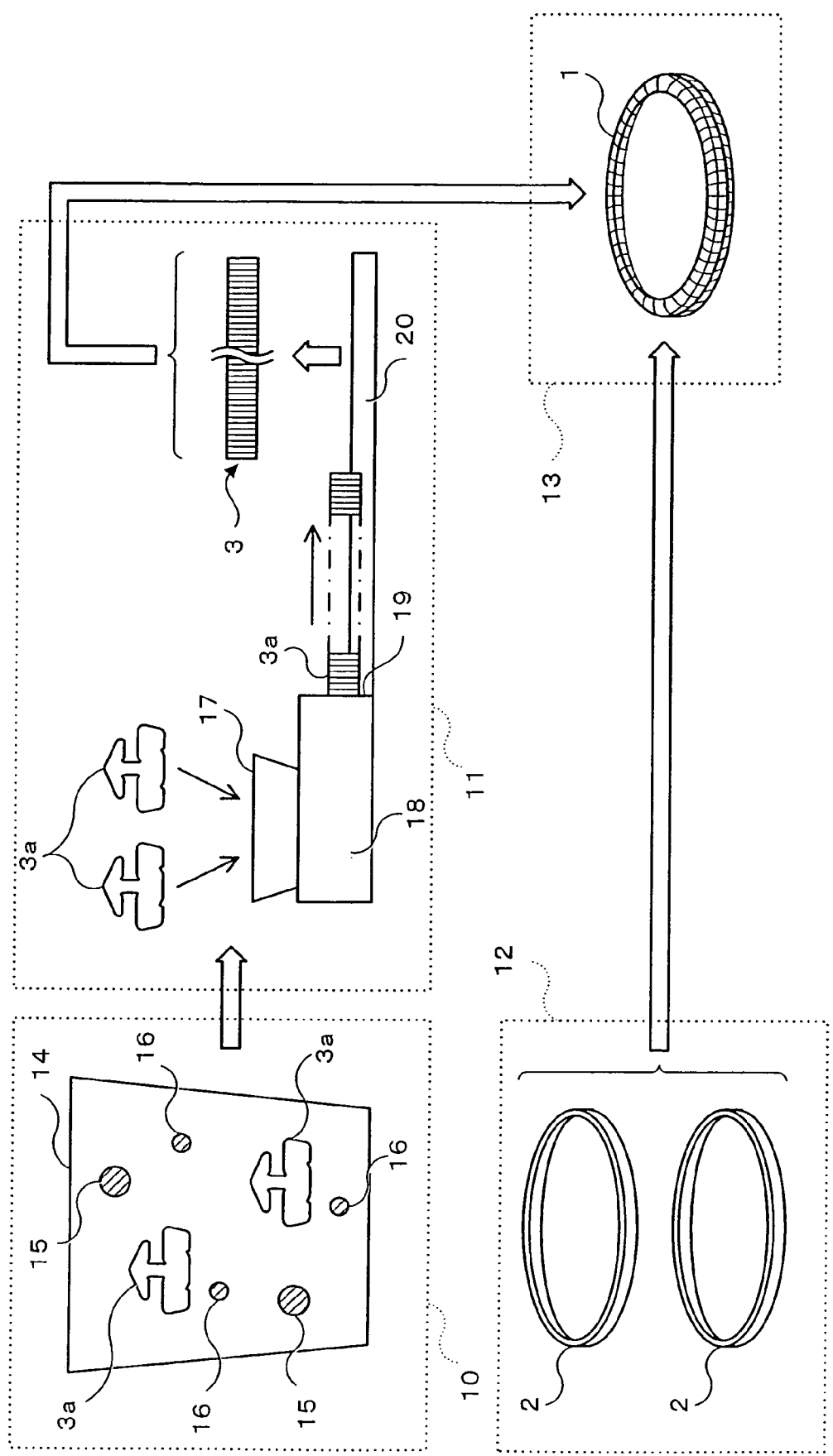
FIG. 1 is an outline diagram of the manufacturing process for a CVT belt in the embodiment of the present invention.

FIG. 1 is an outline diagram of the manufacturing process for a CVT belt. These processes comprise the steps of: a $1^{st}$ process 10 for performing barrel polishing of the metal elements 3$a$; a $2^{nd}$ process 11 (conveying means: transportation part) for transporting an aligned stacked layer of the metal elements 3$a$ after proceeding through the $1^{st}$ process 10; a $3^{rd}$ process 12 for assembling two stacks of about 12 endless layers of the metal belts 2$a$ which produces two laminated belts 2; one group of the metal elements 3$a$ (layered elements 3 composed of about 400 pieces of the metal elements 3$a$) in an aligned stacked layer state by the $2^{nd}$ process described above is taken out; and a $4^{th}$ process 13 for assembling a CVT belt 1 (Continuously Variable Transmission belt) in which the two laminated belts 2 produced by the above-mentioned $3^{rd}$ process 12 support these layered elements 3.

Here, the $1^{st}$ process 10 places a plurality of the metal elements 3$a$ which have been punch processed and media (for example, an abrasive mixture of large media 15 and small media 16 explained earlier) into a barrel 14. Then, surface treatment, such as deburring of the metal elements 3$a$, "R" attachments, etc. is accomplished by relative friction between the metal elements 3$a$ and the media 15, 16 generated by movement of the barrel 14.

Additionally, in the $2^{nd}$ process 11 the metal elements 3$a$, after proceeding through the 1st process 10, are tossed into an entrance slot 17 (refer to FIG. 1) and the direction of the metal elements 3a is arranged in an alignment stacked layer mechanism 18. Then, a plurality of the metal elements 3a is organized in a stacked layer state and sequentially transported (travel) on the upper part of a rail 20 toward the exterior from an outlet 19. A group of the metal elements 3a of a predetermined number (about 400 pieces) are taken out near the end tip of the rail 20. The two laminated belts 2 produced by the above-mentioned $3^{rd}$ process are supported by these layered elements 3 and a CVT belt 1 is assembled.

Figure 2:
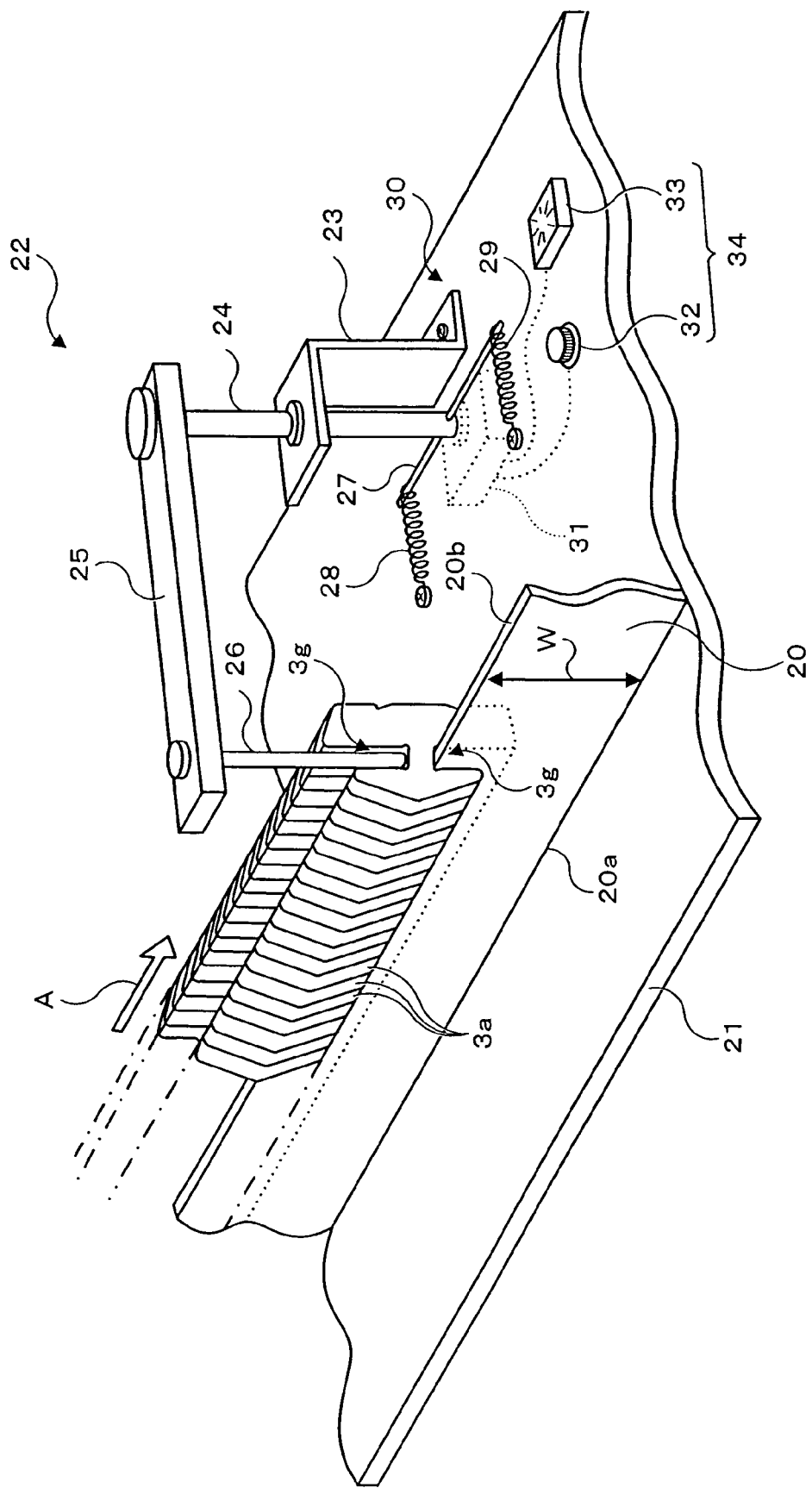
FIG. 2 is a substantial part configuration diagram including the metal element inspection device in the embodiment.

FIG. 2 is a substantial part configuration diagram including the metal element inspection device in the embodiment. In particular, this drawing illustrates the rail 20 of the above-mentioned $2^{nd}$ process and the adjacent detailed configuration example. Specifically, the rail 20 is installed so that the width direction "W" is formed vertically relative to the surface of a table 21 and the lower surface 20a of the rail 20 is fixed to the surface of the table 21. One end direction of the rail 20 drawing is inserted in the inner part of the alignment stacked layer mechanism 18 (refer to FIG. 1) as stated above. Following in the direction of the arrow "A", a plurality of the metal elements 3a in an aligned stacked layer state are sequentially drawn out from the inner part of the alignment stacked layer mechanism 18. With the lower side recessed part 3g of the metal elements 3a inserted on the upper side surface of the rail 20 in a free movement state, the stacked layer slides smoothly on the rail 20 and is guided (conveying) toward the near side of the other end in the drawing.

Hereinafter, as seen in FIG. 2, a metal element inspection device 22 having the following configuration will be explained.

Specifically, the metal element inspection device 22 comprises a stay 23 mounted to the surface of the table 21; a shaft 24 in an upright position supported by the stay 23; an arm 25 mounted horizontally on the upper end of the shaft 24; and an inspection rod 26 of predetermined length mounted at the leading edge of the arm 25 in a fixed state. In addition, the free rotation of the shaft 24 is resiliently regulated an comprises, for example, a rotation regulating means 30 composed of a pin 27 which penetrates sideways near the lower end of the shaft 24 and a pair of springs 28, 29 which function as equal and unidirectional pull tension force on both ends of the pin 27; a detecting means 31 for detecting situations when the above-mentioned shaft 24 is rotated against the restraining force (force of the pair of springs 28, 29) of the rotation regulating means 30; and a reporting means 34 for reporting situations when circumferential rotation of the shaft 24 is detected by the detecting means 31, for example, composed of a lamp 32, buzzer 33, etc.

Figure 3A:
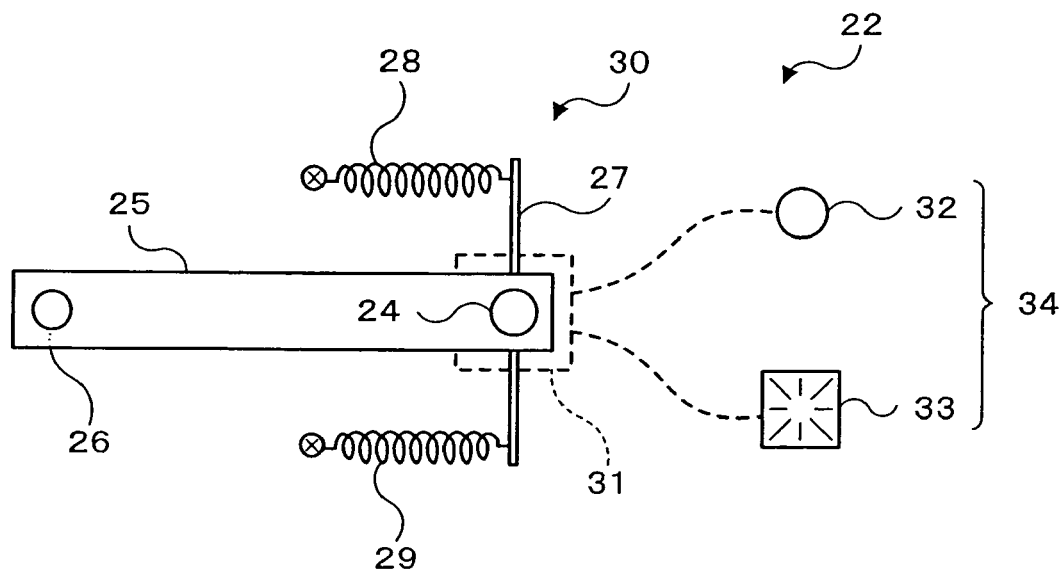
FIG. 3A is a mechanism explanatory diagram of the metal element inspection device 22.
Figure 3B:
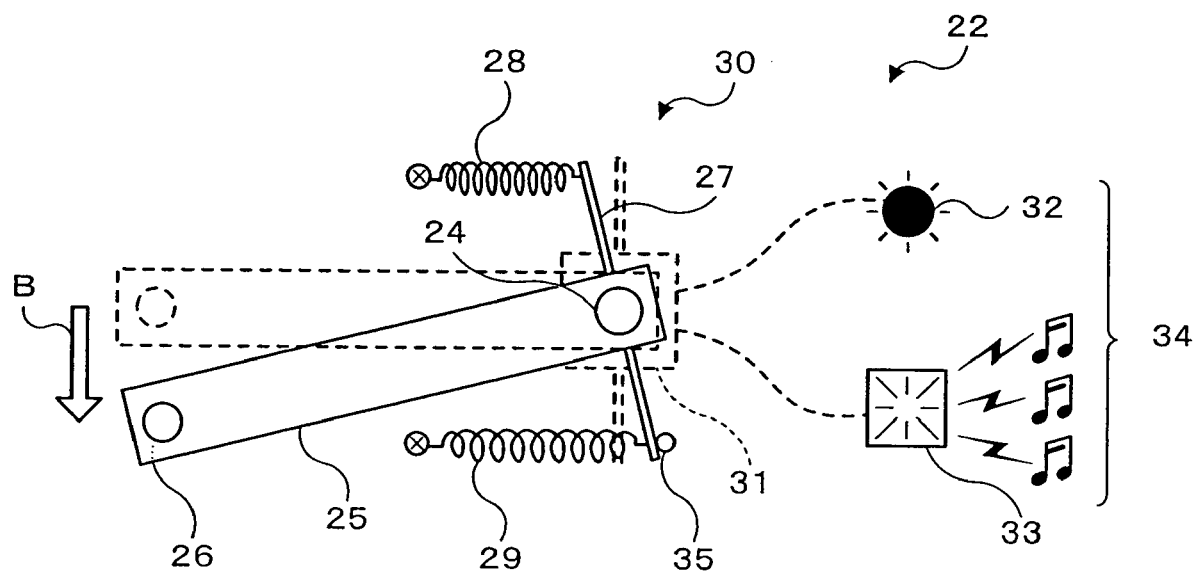
FIG. 3B is a mechanism explanatory diagram of the metal element inspection device 22.

FIG. 3 is a mechanism explanatory diagram of the metal element inspection device 22. FIG. 3A is a mechanism explanatory diagram when in a "steady condition". FIG. 3B is a mechanism explanatory diagram when in an "abnormal conditions".

Specifically, when there is no force applied in any way to the inspection rod 26 at the leading edge of the arm 25, the shaft 24 is in the FIG. 3A state under the restraining force of the rotation regulating means 30. In this case, because rotation of the shaft 24 is not detected by the detecting means 31, the reporting means 34 is in a non-reporting state (the indicator lamp 32 remains unlit, the buzzer 33 does not pulsate).

On the other hand, when there is force applied, for example, as seen in FIG. 3B facing down (direction of arrow "B"), to the inspection rod 26 at the leading edge of the arm 25 in a limited amount which exceeds the restraining force of the rotation regulating means 30, the shaft 24 rotates (turns) as illustrated in FIG. 3B. As a direct result, this rotation is detected by the detecting means 31 and the reporting means 34 shifts to a reporting state (the indicator lamp 32 lights up and the buzzer 33 pulsates).

FIG. 4A is a related view of the inspection rod 26 at the leading edge of the arm 25 and a metal element 3a being transported on the rail 20. As seen in this drawing in a conveying state, the inspection rod 26 is "loosely inserted" in noncontact with the inner segment of the recessed part 3g (the metal element 3a upper side while being transported). "Loosely inserted" indicates a suitable amount limit of play (slack) so that the inspection rod 26 does not directly touch the metal elements 3a. This is a preferred measure for preventing abrasion damage to the surface (in particular the surface of the recessed part 3g) of the metal elements 3a by contact with the inspection rod 26.

FIGS. 4B and 4C are related views of the inspection rod 26 at the leading edge of the arm 25 and a metal element 3a being transported on the rail 20. FIG. 4B illustrates a case which does not contain lodged media. FIG. 4C illustrates a case which does contain lodged media.

When there is no lodged media between the metal elements 3a and the inspection rod 26, the above-mentioned "loosely inserted" status is maintained. As the metal elements 3a and the inspection rod 26 are in a noncontact position with each other, sliding (direction of arrow "A") of the metal elements 3a is not obstructed. In this case, the metal element inspection device 22 is in the above-mentioned "steady condition" (refer to FIG. 3A).

On the other hand, when there is lodged media present, as the lodged portion of the media 4 (foreign matter) among the metal elements 3a reaches the position of the inspection rod 26 in an inactive state (quiescent state), the inspection rod 26 is pushed in the direction of arrow "B" by the media 4. Ultimately, as the sliding metal elements 3a are obstructed, the metal element inspection device 22 transitions from the above-mentioned "steady condition" to an "abnormal condition" (refer to FIG. 3B).

Consequently, in such a case a purported report (the indicator lamp 32 lights up and the buzzer 33 pulsates) of detected lodged media is performed by the reporting means 34 of the metal element inspection device 22. A worker then responds to the report and accomplishes the required procedure, for example, executing a procedure for extracting the applicable metal element 3a (the metal element 3a situated directly before the inspection rod 26), removing the lodged media 4, etc.

According to the metal element inspection device 22 of the embodiment described above, the inspection rod 26 is inserted by noncontact into one of the two recessed parts 3g of the metal elements 3a while being sequentially transported in an aligned stacked layer state on the upper part 20b of the rail 20. The suppressing strength applied to the inspection rod 26 is translated into rotational movement of the shaft 24. As the detecting means 31 detects that rotational movement, the reporting means 34 reports the circumferential movement. In this manner, when a metal element 3a mixed with lodged media 4 is generated in the "work" (metal elements 3a) assemblage while being transported, movement of the above-mentioned inspection rod 26 can be translated into rotational movement of the shaft 24, the detecting means 31 can detect that rotational movement and the reporting means 34 can inform a worker.

Therefore, inspection of lodged media 4 can be automated and visual inspection of the metal elements 3a by a worker can be made unnecessary. As a direct result, the disadvantages when performing visual inspections, such as being troublesome and non-efficient, are capable of being solved.

Also, the above description explains an example concerning detection of the media 4 lodged in the upper side recessed parts 3g of the metal elements 3a which slide along on the upper part of the rail 20. However, in the embodiment of the metal element inspection device 22, the media 4 not only lodged in upper side recessed parts 3g, but also the media 4 lodged in the lower side recessed parts 3g (the recessed parts 3g which slide on the upper side surface 20b of the rail 20) can be conveniently detected.

Figure 5A:
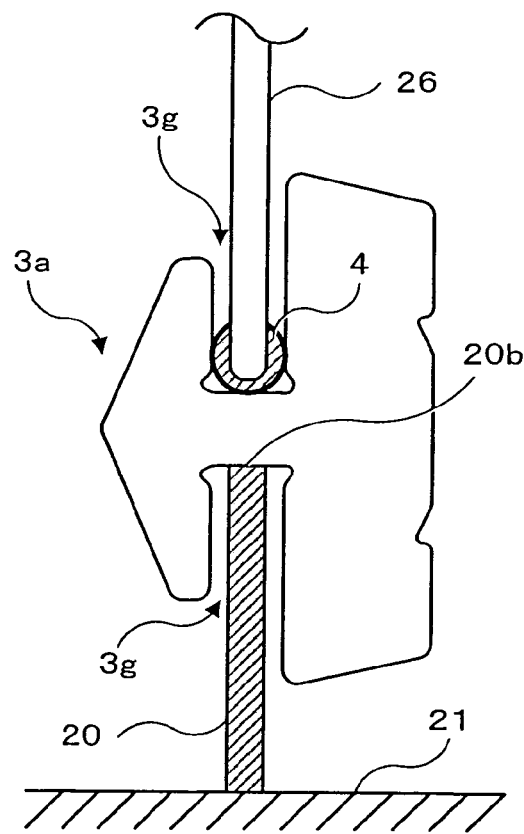
FIG. 5A is a conceptual diagram of when detecting the media 4 lodged in the upper side of the recessed parts 3$g$ and the lower side of the recessed parts 3$g$ of the metal elements 3$a$, respectively.
Figure 5B:
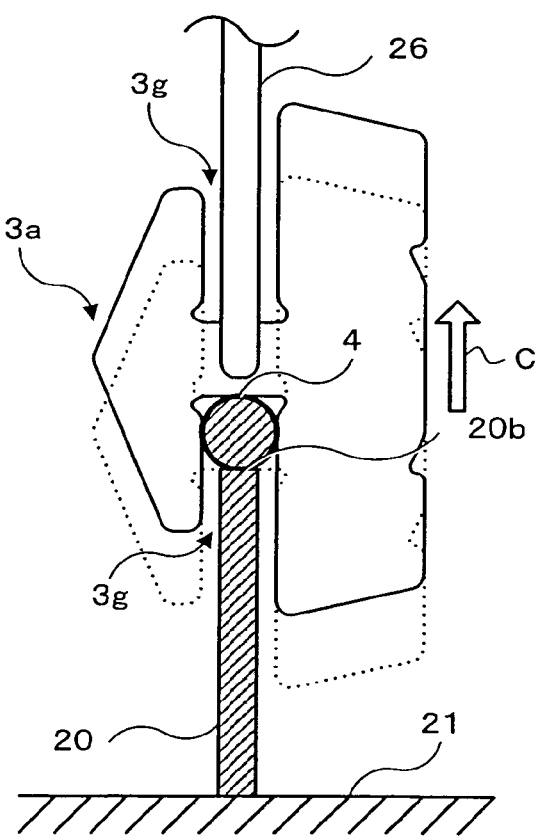
FIG. 5B is a conceptual diagram of when detecting the media 4 lodged in the upper side of the recessed parts 3$g$ and the lower side of the recessed parts 3$g$ of the metal elements 3$a$, respectively.
Figure 6A:
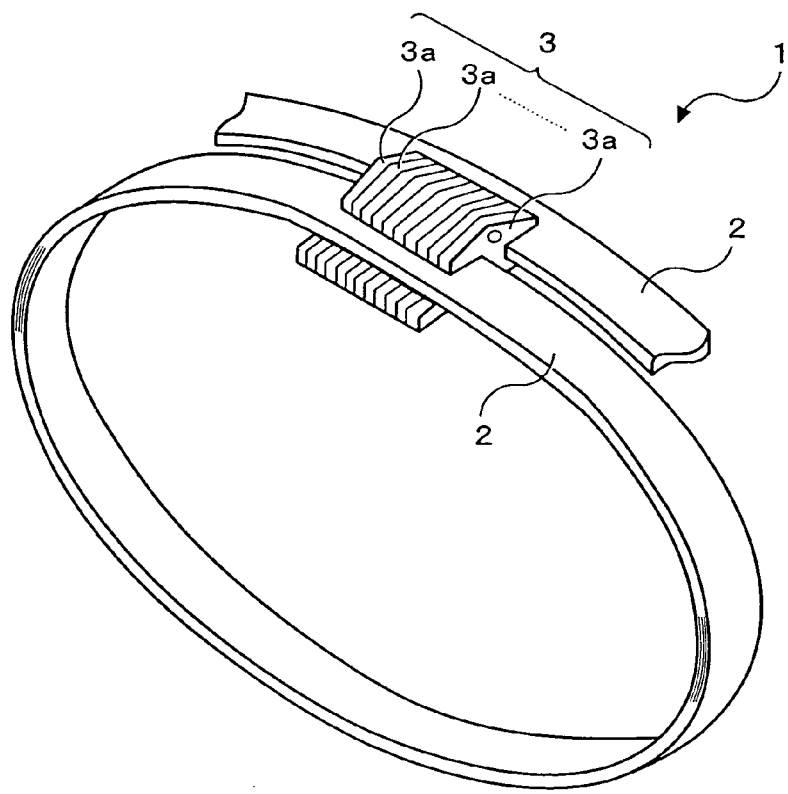
FIG. 6A is an outline view diagram of a CVT belt in conventional prior art.
Figure 6B:
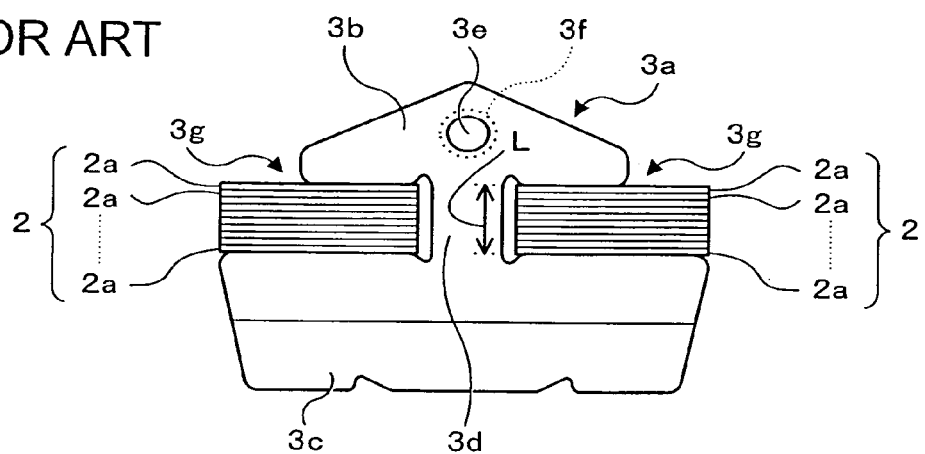
FIG. 6B is an outline view diagram of a metal element 3$a$ in conventional prior art.
Figure 6C:
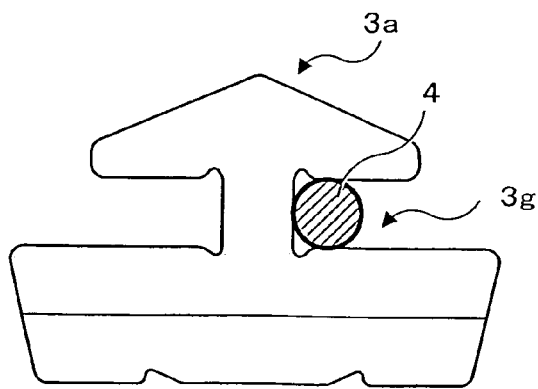
FIG. 6C is an outline view diagram of a metal element 3$a$ in conventional prior art.

FIG. 5 is a conceptual diagram of when detecting the media 4 lodged in the upper side of the recessed parts 3g and the lower side of the recessed parts 3g of the metal elements 3a, respectively. FIG. 5A illustrates a case when the media 4 is lodged in the upper side of the recessed parts 3g. FIG. 5B illustrates a case when the media 4 is lodged in the lower side of the recessed parts 3g.

As described previously, because the inspection rod 26 is inserted in the upper side of the recessed parts 3g of the metal elements 3a, the media 4 lodged in this upper side of the recessed parts 3g is directly detectable by the movement of the inspection rod 26. On the other hand, the lower side of the recessed parts 3g of the metal elements 3a is placed on the rail 20 instead of the inspection rod 26 and the media 4 lodged in this lower side of the recessed parts 3g is directly detectable by the movement of the inspection rod 26.

However, in this case, a metal element 3a containing lodged media 4 is slightly uplifted (raised) in the direction of arrow "C" from the rail 20 and that uplifted portion interferes with the inspection rod 26. Likewise the movement of the inspection rod 26 can be translated into rotational movement of the shaft 24, the detecting means 31 can detect that rotational movement and the reporting means 34 can inform a worker.

The present invention is not limited to the above-mentioned preferred embodiments. It should be emphasized that various development examples and modification examples may be made without departing substantially from the spirit and principles of the technical concept. For example, the present invention may be implemented as in the following examples.

(1) An example which does not require the rotation regulating means 30, the detecting means 31 and the reporting means 34.

In the above preferred embodiment, although a rotation regulating means 30, the detecting means 31 and the reporting means 34 are comprised, this is automated detection of the media 4 lodged in the metal elements 3a and shows only the best embodiment (best mode) of reporting these circumferential detection results. For example, the shaft 24 fixed to the stay 23 and the table 21 may be constructed to be unrotatable. In this case, the rotation regulating means 30, the detecting means 31 and the reporting means 34 are unnecessary.

In this manner, in order to trap a metal element 3a with lodged media 4, the operation could be made to stop on the rail 20 at the inspection rod 26 position. From that idle state, the worker can readily recognize the lodged media 4. Besides, when implemented in this fashion, the inspection rod 26 may always retain an actual location. For example, it is practicable that gradually lodged media 4 can be scraped out and removed by the inspection rod 26 as well as removal of the media 4 can be automated.

(2) An example which adds a stopper to the rotation regulating means 30.

As stated previously, the rotation regulating means 30 of the above-mentioned preferred embodiment is a component for regulating the free rotation of the shaft 24. That configuration, for example, comprises a pin 27 which penetrates sideways near the lower end of the shaft 24 and a pair of springs 28, 29 which function as equal and unidirectional pull tension force on both ends of the pin 27.

According to this configuration, the rotation of the shaft 24 is regulated by the force of the springs 28, 29, but that rotation amount is relatively high (up to the flexible limitation of the pair of springs 28, 29). Accordingly, the effect referred to in reference (1) above of "scraping out and removal by the inspection rod 26" cannot be expected.

Stated differently, although regulated by the force of the pair of springs 28, 29, rotation of the shaft 24 is allowed in a certain range. For example, even if gradually lodged media 4 exists, that media 4 will be pushed and the inspection rod 26 will be displaced. Thus, the above-mentioned scraping out and removal effect is not acquired.

Therefore, as an improvement example, a stopper which restricts (limits) the rotation of the shaft 24 to a predetermined value is provided. This stopper may set to a position which regulates the pivot size of the pin 27 at a predetermined amount, for example, as seen in the element number 35 in FIG. 3B.

In this manner, the rotation of the shaft 24 can be restricted at a predetermined amount with the stopper 35. For example, in the case where gradually lodged media 4 exists, the inspection rod 26 which is pushed by the media 4 and displaced can be stopped along the way. Then, during the inspection rod 26 idle state, the media 4 can be scraped out and a removal effect acquired.

While the present invention has been described with reference to the preferred embodiments, it is intended that the invention be not limited by any of the details of the description therein but includes all the embodiments which fall within the scope of the appended claims.

What is claimed is:

1. A metal element inspection device comprising:
   a conveying means for sequentially transporting a plurality of metal elements, wherein a flank side recessed part formed in a metal element for a Continuously Variable Transmission belt is placed on a rail and travels along said rail; and
   an inspection rod inserted in noncontact with an opposite side recessed part of said metal element in said conveying state; and
   said metal element inspection device inspects for the existence of foreign matter being present as a result of interference by an uplifted portion of said metal element from said rail due to foreign matter lodged between the flank side recessed part of said metal element and said inspection rod, or interference by foreign matter lodged between the opposite side recessed part of said metal element and said inspection rod.

2. The metal element inspection device according to claim 1, further comprises:
   a detecting means for detecting movement of said inspection rod; and
   a reporting means for reporting circumferential movement of said inspection rod when detected by said detecting means.

3. An element inspection method for a Continuously Variable Transmission belt comprising the steps of:
   a conveying process for sequentially transporting a plurality of metal elements, wherein a flank side recessed part formed in a metal element for a Continuously Variable Transmission belt is placed on a rail and travels along said rail; and a detecting process for detecting movement of an inspection rod inserted in noncontact with an opposite side recessed part of said metal element in a conveying state; and said detecting process detects interference by an uplifted portion of said metal element from said rail due to foreign matter lodged in the flank side recessed part of said metal element, or interference by foreign mailer lodged in the opposite side recessed part of said metal element, and inspects for the existence of foreign matter being present from a detection result.

4. The element inspection method for the Continuously Variable Transmission belt according to claim 3, further comprises:

a reporting process for reporting circumferential movement of said inspection rod when detected by said detecting process.

* * * * *